R. C. SUTTON.
CHICKEN BROODER.
APPLICATION FILED OCT. 8, 1912.

1,091,900.

Patented Mar. 31, 1914.

Witnesses.
Roscoe M. Dexter.
Edith M. Bromley

Inventor.
Raymond C. Sutton
By. James R. Jenks
Attorney.

UNITED STATES PATENT OFFICE.

RAYMOND C. SUTTON, OF NORTH ATTLEBORO, MASSACHUSETTS.

CHICKEN-BROODER.

1,091,900.

Specification of Letters Patent.   Patented Mar. 31, 1914.

Application filed October 8, 1912.   Serial No. 724,525.

*To all whom it may concern:*

Be it known that I, RAYMOND C. SUTTON, a citizen of the United States, residing at North Attleboro, in the county of Bristol and State of Massachusetts, have invented certain new and useful Improvements in Chicken-Brooders, of which the following is a specification.

My invention relates to improvements in brooders for chickens, and the object of my invention is to provide a brooder adapted for the accommodation of a hen and which shall have an adjustable entrance for the chickens, and which shall also be provided with a means for holding insecticides and disinfectants and for bringing the same into close contact with the chickens. I accomplish these objects by the device shown in the accompanying drawings, in which—

Figure 1:
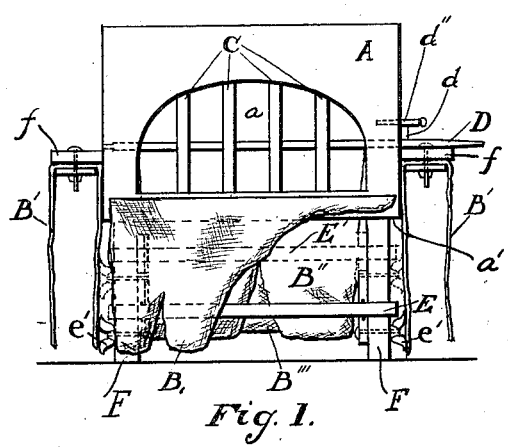
Figure 2:
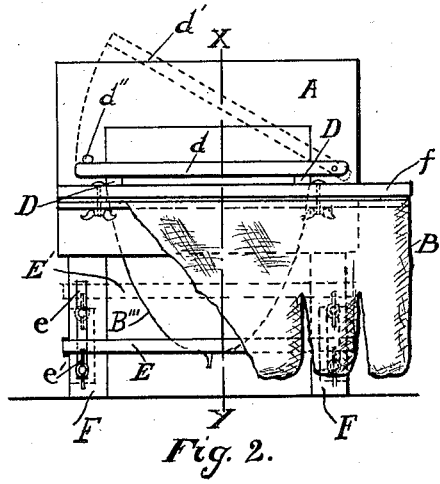
Figure 3:
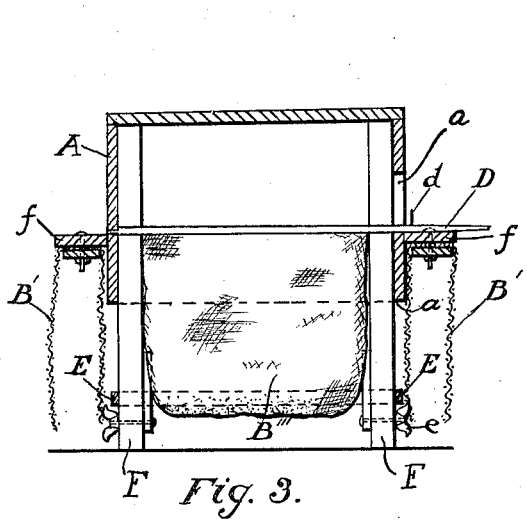

Figure 1 is a front elevation of my brooder; Fig. 2, a side elevation; Fig. 3, a vertical section through the line $x$—$y$ of Fig. 2, and Fig. 4, the receptacle for insecticides or disinfectants.

The same parts of my device are indicated by the same letters throughout the various views.

In Fig. 1 A designates the front of an ordinary cubical box made from wood, metal, or other suitable material, and having an opening $a$, partly closed by vertical slats C. B′ B′ are cloths, preferably of cotton flannel, which are suitably supported by the strips $f$; the loose ends of which cloths hang down so that their lower edges are in close proximity to the ground. A similar cloth $B_1$ is attached to the front end of the brooder by any suitable means, the bottom edge of the latter cloth also coming close to the ground, as shown. A portion of the cloth $B_1$ is cut away to show parts lying behind the same. The front board A of the brooder terminates at the line $a'$ in Fig. 1, leaving an opening below, and the same is true of the remaining three sides. E is a slat extending across this opening and capable of adjustment, as shown, by means of the bolts and thumb screws $e'$—$e'$; the legs or supports F—F being slotted for said bolts as shown in Fig. 2, the dotted position E′ showing approximately the upper limit of adjustment for the slat or bar E.

Figure 4:
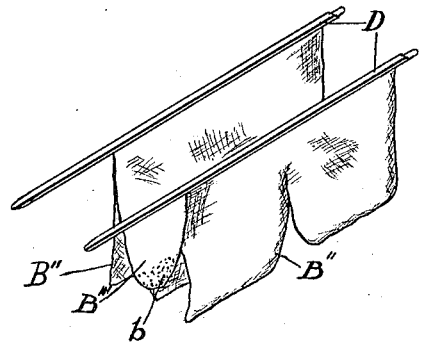

Within the brooder is contained the receptacle B‴, shown in detail in Fig. 4, consisting substantially of a piece of looped cloth suspended from the bars D, the loop of which cloth is adapted to hold the insecticides or disinfectants $b$ and having the loose flaps B″ and B″. The rods or bars D with the cloth receptacle are themselves removable from the brooder at will, together with the attached receptacle B″—B‴. The rods D are held in place at their inner ends by an ordinary rabbet or mortise and at their outer ends by one of the strips $f$. The locking bar $d$—$d'$, shown best in Fig. 2, and capable of being raised or lowered, as there shown, secures the bars D in place and this bar $d$ is held down by the pin $d''$.

The size of the brooder may be varied to suit conditions, but an average size is about fifteen inches square on the ground and not over fifteen inches or thereabout in height. The brooder is large enough for the accommodation of a full grown hen and in use it is found desirable to place the hen within the brooder when it is first used for the accommodation of chickens. The hen, being shut up within the brooder is nevertheless able to project her head through the openings $a$, and also under the bar E all around the brooder, and is thus able to call the chickens. In this way the chickens readily enter the brooder in response to the call of the hen and within a few days become so accustomed to it, that the hen may be removed and the chickens will instinctively run into the brooder of their own accord. The bar E is placed low enough so that the hen cannot crawl out and yet sufficiently high to permit the hen to thrust her head out and also to leave room for the chickens to run underneath the bar and as the chickens grow in size the bar E may be raised until it occupies the position shown in dotted lines in Fig. 1.

The disinfectant or insecticide $b$ is used preferably in a finely powdered form, and more or less of this, as the chickens run around underneath the same, sifts through the cloth B‴ and thus tends to promote the health and comfort of the chickens, and the odor of the disinfectant filling the brooder aids in this purpose. The loop of cloth is hung low enough so that it comes into actual contact with the chickens as they move about in the brooder. This not only brings them in contact with the disinfectant or insecticide, but the sensation of the cloth upon their backs tends to keep them in the middle of the brooder, and thus avoids danger from smothering inasmuch as chickens without this loop would tend to huddle too closely in the corners of the brooder.

The device shown in Fig. 4 with the rods D to which the same is attached may be easily removed by pulling out the pin $d''$, raising the bar $d$, and withdrawing the entire attachment from the brooder either for cleaning or refilling.

In Figs. 2 and 3 the flap $B''-B''$ of the device shown in Fig. 4 is omitted in order to disclose more clearly the receptacle $B'''$.

In practice the looped cloth is not placed within the brooder until the hen has been removed.

In brooders not adapted for the receiving of a grown hen great difficulty is experienced in teaching the chickens to enter the same, but by making the same suitable for the accommodation of a hen, the chickens learn without trouble, and much time is thus saved to the person using the brooder.

Having thus described my invention, what I claim and desire to secure by Letters Patent is—

1. In a brooder, a reticulated vermicide distributer constituting a hover.

2. In a brooder, a pendulous reticulated vermicide distributer constituting a hover.

3. In a brooder, a reticulated vermicide distributer constituting a hover, and side wings providing pendulous closures for the brooder.

4. In a brooder, a hover comprising a pair of supports, and a sheet of fabric secured to the supports and forming an intermediate pocket for a vermicide and lateral closure wings.

In testimony whereof I affix my signature in presence of two witnesses.

RAYMOND C. SUTTON.

Witnesses:
 ROSCOE M. DEXTER,
 EDITH M. BROMLEY.

---

Copies of this patent may be obtained for five cents each, by addressing the "Commissioner of Patents, Washington, D. C."